(12) United States Patent
Tu et al.

(10) Patent No.: US 12,322,132 B2
(45) Date of Patent: Jun. 3, 2025

(54) MACHINE VISION DETECTION METHOD, DETECTION APPARATUS AND DETECTION SYSTEM THEREOF

(71) Applicant: CONTEMPORARY AMPEREX TECHNOLOGY (HONG KONG) LIMITED, Hong Kong (CN)

(72) Inventors: Yinhang Tu, Ningde (CN); Yifei Gao, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 28 days.

(21) Appl. No.: 18/524,990

(22) Filed: Nov. 30, 2023

(65) Prior Publication Data

US 2024/0095949 A1 Mar. 21, 2024

Related U.S. Application Data

(63) Continuation of application No. PCT/CN2021/142250, filed on Dec. 29, 2021.

(51) Int. Cl.
*G06T 3/06* (2024.01)
*G06T 7/00* (2017.01)
(Continued)

(52) U.S. Cl.
CPC .................. *G06T 7/73* (2017.01); *G06T 3/06* (2024.01); *G06T 7/0004* (2013.01); *G06T 7/60* (2013.01); *G06T 2207/10028* (2013.01)

(58) Field of Classification Search
CPC .......... G06T 7/73; G06T 3/06; G06T 7/0004; G06T 7/60; G06T 2207/10028;
(Continued)

(56) References Cited

FOREIGN PATENT DOCUMENTS

CN 10948956 A 3/2019
CN 110530278 A * 12/2019
(Continued)

OTHER PUBLICATIONS

The European Patent Office (EPO) The Extended European Search Report for Application No. 21969381.9 11 Pages.
(Continued)

*Primary Examiner* — Sheela C Chawan
(74) *Attorney, Agent, or Firm* — ANOVA LAW GROUP, PLLC

(57) ABSTRACT

A machine vision detection method includes receiving a three-dimensional image from a line laser, converting the three-dimensional image into a two-dimensional grayscale image, obtaining a boundary of a first component and a boundary of a second component in the two-dimensional grayscale image, determining N perpendicular lines between the boundary of the first component and the boundary of the second component, and calculating an average length of the N perpendicular lines as a gap between the first component and the second component. The three-dimensional image includes at least a portion of the boundary of the first component, at least a portion of the boundary of the second component, and a welding spot located on the boundary of the first or second component. N is a positive integer.

9 Claims, 12 Drawing Sheets

(51) Int. Cl.
*G06T 7/60* (2017.01)
*G06T 7/73* (2017.01)

(58) Field of Classification Search
CPC ......... G06T 3/40; G06T 7/10; G01B 11/2513; G01B 11/2518; G01B 5/0037; G01B 11/03
USPC .................................................. 382/100, 154
See application file for complete search history.

(56) References Cited

FOREIGN PATENT DOCUMENTS

| | | | |
|---|---|---|---|
| CN | 111630342 A | 9/2020 | |
| CN | 111901499 A | 11/2020 | |
| CN | 112053376 A | 12/2020 | |
| CN | 116772723 A | 9/2023 | |
| DE | 102014016087 A1 | 12/2014 | |
| EP | 2495525 A1 * | 9/2012 | ............. G01B 11/25 |
| JP | 2014035656 A | 2/2014 | |

OTHER PUBLICATIONS

The European Patent Office (EPO) The Partial Supplementary European Search Report for Application No. 21969381.9 Apr. 18, 2024 14 Pages.

The Japan Patent Office (JPO) Notification of Reasons for Refusal for Application No. 2023-553313 Jun. 18, 2024 8 Pages (with translation).

The World Intellectual Property Organization (WIPO) International Search Report and Written Opinion for PCT/CN2021/142250 Jul. 27, 2022 15 pages (including English translation).

* cited by examiner

MACHINE VISION DETECTION METHOD, DETECTION APPARATUS AND DETECTION SYSTEM THEREOF

CROSS-REFERENCE TO RELATED APPLICATION

This application is a continuation of International Application No. PCT/CN2021/142250, filed on Dec. 29, 2021, the entire content of which is incorporated herein by reference.

TECHNICAL FIELD

The present application relates to the field of machine vision, and in particular, to a machine vision detection method, and a detection apparatus and detection system thereof.

BACKGROUND

During production, post-welding detection of workpieces is usually carried out by "visual detection". The visual detection is mainly based on observation by naked eyes, combined with the use of auxiliary tools such as magnifying glass, measuring tools and templates to carry out a comprehensive inspection on surface quality and visual dimensions of welding seams.

In order to improve the efficiency of manual detection, some existing machine vision detection solutions are implemented based on industrial cameras. However, these machine vision detection solutions are limited by structural design, cost control and matching with actual application scenarios etc., and there are still many drawbacks. Both the detection accuracy and detection efficiency thereof remain to be improved.

SUMMARY

In view of the foregoing issues, the present application provides a machine vision detection method, a detection apparatus, and a detection system thereof, which is capable of improving efficiency and accuracy of machine vision detection.

In a first aspect, the present application provides a machine vision detection method. The method comprises: receiving a three-dimensional image from a line laser, the three-dimensional image including: at least a portion of the boundary of a first component, at least a portion of the boundary of a second component, and at least a welding spot located on the boundary of the first component and the boundary of the second component; converting the three-dimensional image into a two-dimensional grayscale image; obtaining the boundary of the first component and the boundary of the second component in the two-dimensional grayscale image; determining N perpendicular lines between the boundary of the first component and the boundary of the second component; and calculating an average length of the N perpendicular lines as a gap between the first component and the second component, where N is a positive integer.

In the technical solution of the embodiment of the present application, by collecting three-dimensional image through the line laser, continuous sampling of to-be-detected component can be supported, and the camera does not need to be calibrated in advance. In addition, by means of obtaining an average length of the plurality of perpendicular lines, the gap between the two components can be calculated more precisely, thereby improving the detection accuracy.

In some embodiments, the step of obtaining the boundary of the first component and the boundary of the second component in the two-dimensional grayscale image specifically comprises: arranging, in a boundary area including the boundary of the first component, N first fitting units equally dividing the boundary area; sequentially connecting intersection points between each of the first fitting units and the boundary of the first component to form a first straight line fitted to the boundary of the first component; arranging, in a boundary area including the boundary of the second component, N second fitting units equally dividing the boundary area; and sequentially connecting the intersection points between each of the second fitting units and the boundary of the second component to form a second straight line fitted to the boundary of the second component; wherein, N is a positive integer between 20 and 50. In the foregoing technical solution, the boundary straight line is obtained by arranging a plurality of fitting units evenly dividing the boundary area, so that it is convenient to adjust fitting degree of the fitted straight line by adjusting the number of fitting units, thereby meeting requirements of different actual situations.

In some embodiments, the step of generating N perpendicular lines between the boundary of the first component and the boundary of the second component specifically comprises: determining intersection points between N first fitting units and the boundary of the first component as set points for perpendicular lines; generating N perpendicular lines perpendicular to the second straight line by taking each set point for perpendicular line as a starting point respectively; or determining intersection points between N second fitting units and the boundary of the second component as set points for perpendicular lines; and generating N perpendicular lines perpendicular to the first straight line by taking each set point for perpendicular line as a starting point respectively. In the foregoing technical solution, by generating the perpendicular lines on the basis of the intersection points between the fitting units and the boundary of the components, the N perpendicular lines can be evenly distributed along the gap, thereby calculating the gap between the two components more precisely.

In some embodiments, the method above further comprises: extracting a third straight line and a fourth straight line respectively fitted to both side boundaries of a welding spot in the two-dimensional grayscale image; determining a first tangent point where the third straight line is tangent to the welding spot and a second tangent point where the fourth straight line is tangent to the welding spot; and calculating a distance between the first tangent point and the second tangent point as the width of the welding spot.

In the technical solution of the embodiment of the present application, a method of calculating the width of a welding spot between two components based on a three-dimensional image is further provided. The width can be automatically calculated by obtaining a fitted straight line that is fitted to the boundary of a welding spot, so as to evaluate weld status between components comprehensively.

In some embodiments, the step of extracting a third straight line and a fourth straight line respectively fitted to both side boundaries of a welding spot in the two-dimensional grayscale image specifically comprises: arranging, in a boundary area including the first side boundary of the welding spot, M third fitting units equally dividing the boundary area respectively; sequentially connecting intersection points between each of the third fitting units and the first side boundary of the welding spot to form the third straight line, and; arranging, in a boundary area including the second side boundary of the welding spot, M fourth fitting units equally dividing the boundary area respectively; sequentially connecting intersection points between each of the fourth fitting units and the second side boundary of the welding spot to form the fourth straight line; wherein, M is a positive integer between 30 and 50.

In the foregoing technical solution, the boundary of the welding spot is obtained by arranging a plurality of fitting units equally dividing the boundary area, so that it is convenient to adjust the fitting degree between the fitted straight line and the boundary of the welding spot by adjusting the number of fitting units, thereby meeting the requirements of different actual situations.

In some embodiments, the step of determining a first tangent point where the third straight line is tangent to the welding spot and a second tangent point where the fourth straight line is tangent to the welding spot specifically comprises: taking the intersection point between the last third fitting unit on the third straight line and the first side boundary of the welding spot as the first tangent point; and taking the intersection point between the last fourth fitting unit on the fourth straight line and the second side boundary of the welding spot as the second tangent point. In the foregoing technical solution, by using the feature that the boundary area is equally divided by the fitting units, the first tangent point and the second tangent point can be approximately determined simply and quickly through the last fitting units of the fitted straight lines.

In some embodiments, the step of determining a first tangent point where the third straight line is tangent to the welding spot and a second tangent point where the fourth straight line is tangent to the welding spot specifically comprises: taking the intersection point between the third straight line and the first straight line as the first tangent point; and taking the intersection point between the fourth straight line and the first straight line as the second tangent point. In the foregoing technical solution, considering that the width of the welding spot can be substantially regarded as the width of the gap between the two components, it is thus possible to quickly determine two tangent points for calculating the width of the welding spot based on the intersection points between the fitted straight lines of the components and the fitting on both sides of the welding spot, which can help to obtain an accurate calculation result on the width of the welding spot.

In a second aspect, the present application provides a machine vision detection apparatus. The machine vision detection apparatus includes: a receiving module for receiving a three-dimensional image from a line laser, the three-dimensional image including: at least a portion of the boundary of a first component, at least a portion of the boundary of a second component, and at least a welding spot located on the boundary of the first component and the boundary of the second component; a conversion module for converting the three-dimensional image into a two-dimensional grayscale image; a fitting module for obtaining the boundary of the first component and the boundary of the second component in the two-dimensional grayscale image; and a gap calculation module for determining N perpendicular lines between the boundary of the first component and the boundary of the second component, and calculating an average length of the N perpendicular lines as a gap between the first component and the second component, where N is a positive integer.

In the technical solution of the embodiment of the present application, by collecting three-dimensional image through the line laser, continuous sampling of the to-be-detected component can be supported, and the camera does not need to be calibrated in advance. In addition, the apparatus is capable of calculating the real gap between two components by averaging a plurality of perpendicular lines, and interference caused by image distortion or the like can be effectively eliminated. As a result, the detection speed and detection accuracy are effectively improved.

In a third aspect, the present application provides an electronic device. The electronic device includes a processor and a memory communicatively connected with the processor; the memory stores computer program instructions that, when invoked by the processor, cause the processor to perform the visual detection method as described above.

In the technical solution of the embodiment of the present application, the electronic device collects three-dimensional image through a line laser, so that continuous sampling of the to-be-detected component can be supported, and the camera does not need to be calibrated in advance. In addition, the real gap between two components can be calculated by averaging a plurality of perpendicular lines, and interference caused by image distortion or the like can be effectively eliminated. As a result, the detection speed and detection accuracy are effectively improved.

In a fourth aspect, the present application provides a non-volatile computer storage medium. The non-volatile computer storage medium stores computer program instructions, and the computer program instructions, when invoked by the processor, perform the visual detection method described above.

In the technical solution of the embodiment of the present application, by collecting the three-dimensional image through the line laser, continuous sampling of the to-be-detected component can be supported, and the camera does not need to be calibrated in advance. In addition, the real gap between two components can be calculated by averaging a plurality of perpendicular lines, and interference caused by image distortion or the like can be effectively eliminated. As a result, the detection speed and detection accuracy are effectively improved.

In a fifth aspect, the present application provides a machine vision detection system. The machine vision detection system includes: an image collection device including several line lasers, which is configured to collect three-dimensional images; a driving mechanism, configured to cause a relative movement between the image collection device and a to-be-detected component; and a first controller communicatively connected with the image collection device, the first controller is configured to perform the machine vision detection method above so as to process the three-dimensional image, so that a processing result of the three-dimensional image can be used for detecting the to-be-detected component.

In the technical solution of the embodiment of the present application, continuous sampling of the detection component can be supported, and the camera does not need to be calibrated in advance, so that detection accuracy and detection efficiency can be effectively improved. In addition, the characteristics of the detection area can be intuitively shown through the line laser, which can significantly improve the detection effect of the sampled image and greatly improve the detection accuracy.

In some embodiments, the image collection device includes: two line lasers, a sensor bracket, and a light shield; the two line lasers are respectively arranged on both sides of the sensor bracket; the light shield is fixed on the sensor bracket, and hoods the line laser; the sensor bracket includes a height adjustment module and a spacing adjustment module; the height adjustment module is used to adjust the height of the line lasers; and the spacing adjustment module is used to adjust the distance between the two line lasers.

In the technical solution of the embodiment of the present application, a height adjustment module and a spacing adjustment module are further provided, which enables the machine vision detection system to be adjusted adaptively when the size of a to-be-detected component changes, so as to meet the requirement of detecting various to-be-detected components. Furthermore, the additionally provided light shield can prevent the laser light of the line laser from scattering outwardly and avoid injury to the eyes of an operator.

In some embodiments, the machine vision detection system further includes a second controller, the second controller is configured to control the height adjustment module and the spacing adjustment module so that the two line lasers are enabled to reach a target spacing therebetween and/or a target height; the second controller stores multiple pieces of configuration information for recording the target spacing and target height; and each piece of configuration information corresponds to at least one to-be-detected component. In the foregoing technical solution, configuration information of different models, sizes, or shapes of to-be-detected components may be recorded in advance in the second controller. Therefore, when the size, model or shape of a to-be-detected component changes, automatic switching and fast adjustment be realized by technicians through loading corresponding configuration information, thereby effectively improving compatibility and operation efficiency of the detection system.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

After reading the detailed description of implementations below, various other advantages and benefits will become clear to a person of ordinary skill in the art. The drawings are for the purpose of illustrating some implementations only and are not to be considered as limiting the present application. In addition, in all the accompanying drawings, a same reference symbol is used to represent a same part. In the drawings:

FIG. 7b is a schematic diagram of a boundary according to some embodiments of the present application, which shows a representation of the component boundary obtained in FIG. 7a.

DETAILED DESCRIPTION

Figure 1:
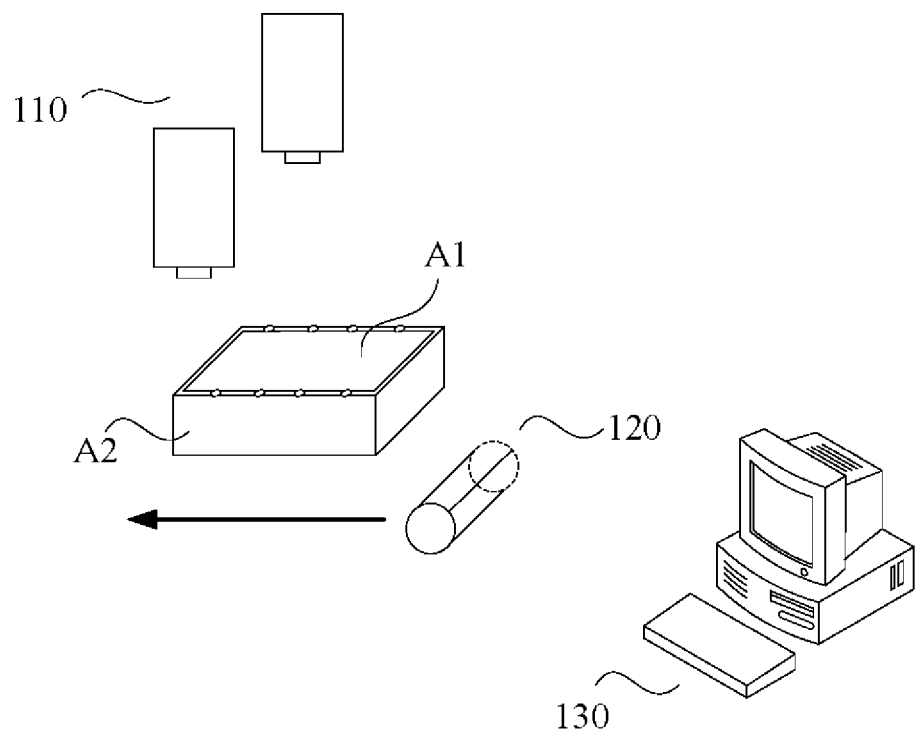
FIG. 1 is a schematic structural diagram of a machine vision detection system according to some embodiments of the present application.

Embodiments of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

The term "embodiment" described herein means that specific features, structures or characteristics in combination with descriptions of the embodiments may be incorporated in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" simply describes the association relation of the associated objects, indicating that there can be three relations, such as A and/or B, indicating that A exists alone, A and B exist simultaneously, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of this application, a direction or a position relation indicated by the technical terms "center", "longitudinal", "lateral", "length", "width", "thickness", "upper", "lower", "front", "rear", "left", "right", "vertical", "horizontal", "top", "bottom", "inside", "outside", "clockwise" "counter clockwise" "axial", "radial", and "circumferential" are based on the location or position shown in the drawings for the convenience and brevity of the description of embodiments of this application, but do not indicate or imply that the apparatus or component referred to must be located or constructed and operated in the specified direction, and therefore, such terms are not constructed as a limitation on the embodiments of the present application.

In the description of the embodiments of the present application, unless otherwise expressly specified and limited, the technical terms "mount", "connected", "connect" and "fix" should be broadly understood, for example, they may be a fixed connection or a detachable connection or be integrated; or may be a mechanical connection or an electrical connection; or may be a direct connection or an indirect connection through an intermediate medium, or may be a communication between the interior of two elements or the interaction of two elements. For a person of ordinary skill in the art, specific meanings of the foregoing terms in the embodiments of the present application may be understood based on a specific case.

Currently, in the production process of lithium battery cells, after a cell is put into a case, a top cover and an aluminum shell of the cell need to be welded. Before the top cover and the aluminum shell of the cell are completely welded, there is a pre-welding process for welding the top cover and the aluminum shell to realize initial positioning therebetween. However, in order to ensure the welding quality between the top cover and the aluminum shell of the cell and avoid poor welding due to problems such as the gap between the top cover and the aluminum shell being too large, after the pre-welding process, it is needed to detect the gap between the top cover and the aluminum shell as well as quality of the welding spot.

A typical machine vision detection method is to use a two-dimensional camera to collect image information of a welded portion between the top cover and the aluminum shell after the pre-welding process, then, process and analyze the image information to determine whether the gap therebetween meets the requirements.

When the above-described machine vision detection method is used, it is needed to calibrate the two-dimensional camera before use and generate a correction file between the pixel distance and the actual distance to help the calculation. In this way, the real distance between the top cover and the aluminum shell cannot be obtained, and it is likely to cause misjudgment when the characteristics of the object are not obvious. In addition, when the two-dimensional camera captures an image, problems such as inaccurate detection and misjudgment of measurement may be caused due to improper light source arrangement, and the time required for detecting the gap is relatively long.

In order to solve the problem of low efficiency of the machine vision detection and insufficient detection accuracy as described above, the applicant provides a method for detecting the gap between components based on line lasers, which can effectively solve the problems that traditional two-dimensional camera needs to be calibrated in advance and the detection accuracy and detection efficiency are low due to lot of interference in the collected image information.

For ease of description, the illustration is given with an example in which the to-be-detected component of the embodiments of the present application is a top cover and an aluminum shell after a pre-welding process. Certainly, a person skilled in the art may understand that, based on the same principle and concept, the machine vision detection system in the embodiments of the present application may also be applied to other to-be-detected components with similar structural or shape characteristics.

Please refer to FIG. 1, FIG. 1 is a schematic structural diagram of a machine vision detection system according to some embodiments of the present application. The machine vision detection system includes: an image collection device 110, a driving mechanism 120, and a first controller 130.

Wherein, the image collection device 110 is a device for collecting the three-dimensional image signal. Specifically, any suitable model and number of line lasers can be selected for the image collection device, which has a support structure adapted to the line lasers.

The driving mechanism 120 is an action unit for causing a relative movement between the to-be-detected component (for example, a cell top cover and a cell aluminum shell after a pre-welding process) and the image collection device 110. Specifically, any suitable type of power mechanism can be used to meet continuous sampling requirements of the image collection device 110. In some embodiments, the to-be-detected component may be clamped and fixed to the driving mechanism 120, and moved relative to the line lasers of the image collection device 110 under driving of the driving mechanism 120, thereby performing image sampling on the to-be-detected component.

The first controller 130 may be an electronic computing device with logical operation function, including but not limited to a server or an industrial computer, or the like. A communication connection may be established between the first controller and the image collection device in a wired or wireless manner, so as to receive three-dimensional image signal collected by the image collection device.

In operation, the cell top cover A1 and the cell aluminum shell A2 after the pre-welding process may move relative to the image collection device 110 at a set speed under driving of a motor or other suitable type of driving mechanism 120. The line laser of the image collection device 110 may continuously collect three-dimensional image signal of two long sides of a to-be-detected component composed of a pre-welded cell top cover A1 and a cell aluminum shell A2 according to a collection frequency adapted to the relative movement speed through a sensor device such as an encoder.

The three-dimensional image signal collected by the image collection device 110 is sent to the first controller 130, and after a series of steps (such as image processing) of the machine vision detection method performed by the first controller 130, the detection result is output and provided to an external device. In this way, it is possible to timely screen out the to-be-detected components whose gap or welding spot do not meet the quality requirements and carry out corresponding treatment.

An advantageous aspect of the embodiment of the present application is that in a situation where a strip-shaped to-be-detected component has a plurality of welding spots, the image collection device may collect three-dimensional image signal of the to-be-detected component in a continuous sampling manner. However, in the technical solution of shooting by a traditional camera, due to the limited shooting range of the camera, after shooting a part of area, the camera has to be moved to a new position for shooting, so as to complete shooting sampling of all welding spots. Compared with the technical solution of shooting by a traditional camera, the continuous scanning manner of the line laser can effectively reduce the frequency of start and stop actions, thereby greatly improving the detection speed.

Figure 2:
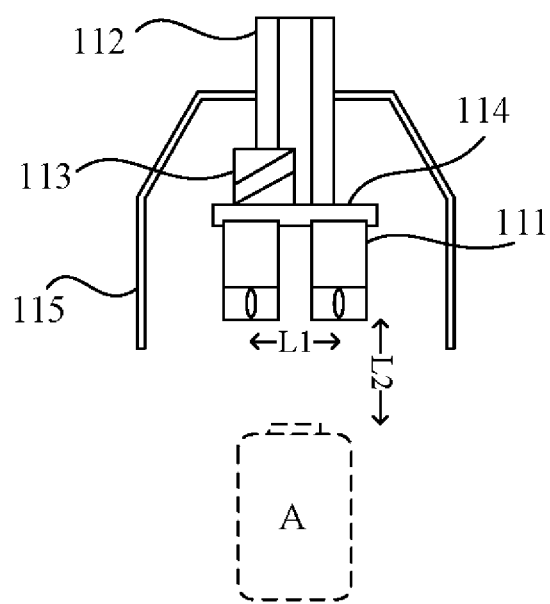
FIG. 2 is a schematic structural diagram of an image collection device according to some embodiments of the present application.

According to some embodiments of the present application, optionally, referring to FIG. 2, the image collection device 110 may include: two line lasers 111, a sensor bracket 112, a height adjustment module 113, a spacing adjustment module 114, and a light shield 115.

Here, the two line lasers 111 are respectively arranged on both sides of the sensor bracket 112, and can be used to simultaneously collect three-dimensional image signal of two symmetrical long sides of the cell top cover and the cell aluminum shell. The line laser may have a suitable field of view and pixel accuracy according to actual needs. For example, the resolution of the line laser 111 in the scanning direction may be set to be smaller than a gap detection threshold (e.g., 0.08 mm) to meet detection requirements. The scan line speed is set at 130 mm/s or more, and the scan frequency is about 5 kHz.

The height adjustment module 113 and the spacing adjustment module 114 are both arranged on the sensor bracket 112. Specifically, it may be implemented by any suitable type of mechanical structure, including but not limited to screws, cylinders or gears, etc.

The height and distance between the two line lasers 111 can be changed within a certain range through the height adjustment module 113 and the spacing adjustment module 114, so as to meet detection requirements of cells with different models or sizes.

The light shield 115 may be arranged on the sensor bracket 112 to cover the line laser 111 therein. Specifically, a cover with any suitable shape, size and material can be used, as long as being capable of covering the line laser 111. Such a design can prevent laser light generated by the line laser from leaking or reflecting to the eyes of an operator, thereby achieving the effect of protecting human body.

It should be noted that in the embodiment of the present application, two line lasers being arranged symmetrically are used as an example for description. A person skilled in the art may understand that such a design is suitable for obtaining welding area on both sides of a to-be-detected component. When the position or size of a welding area of a to-be-detected component changes, different number or different positions of line lasers can be arranged according to actual needs, which is not limited to the situation shown in FIG. 2.

An advantageous aspect of the embodiment of the present application is: performing data collection on the to-be-detected component by using line lasers can effectively avoid the following drawbacks: the image obtained by the traditional camera is not clear, the image is distorted or the gap in the image is smaller than the actual value due to the arrangement of light source.

Another advantageous of the embodiment of the present application is: the line laser provides a three-dimensional image signal, so that multi-angle and multi-directional measurement can be achieved, which can avoid misjudgment of measurement caused by the field of view being blocked, and provide more accurate and intuitive image information.

Figure 3:
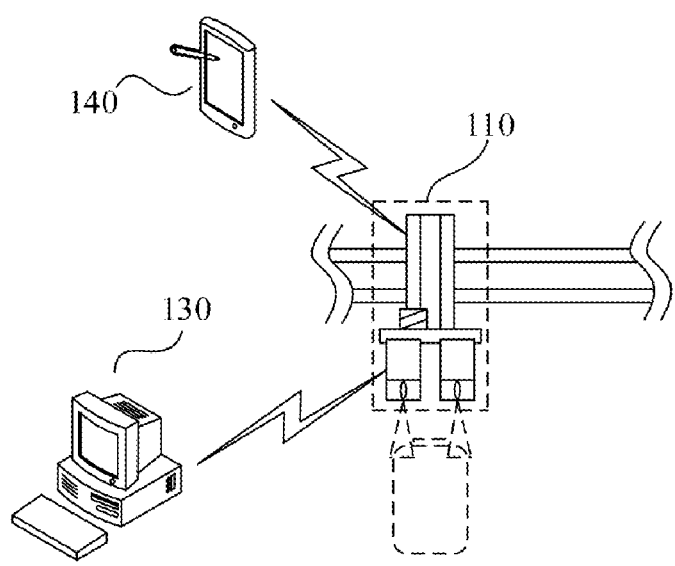
FIG. 3 is a schematic structural diagram of a machine vision detection system according to other embodiments of the present application.

According to some embodiments of the present application, optionally, referring to FIG. 3, FIG. 3 is a schematic structural diagram of a machine vision detection system according to other embodiments of the present application. The machine vision detection system may also include a second controller 140.

Wherein, the second controller 140 stores several pieces of configuration information recording target spacing and target heights the configuration information is data information corresponding to the to-be-detected components, which may be preset by technicians according to actual production conditions.

In operation, when a to-be-detected component entering the machine vision detection system changes, the technician or operator may select and confirm configuration information corresponding to the to-be-detected component that is going to be detected currently, then, according to the selected configuration information, the second controller automatically controls the height adjustment module 113 and the spacing adjustment module 114 to move the line lasers to reach a target spacing therebetween and target heights recorded in the configuration information, so as to accomplish three-dimensional image signal collection of the to-be-detected component.

It should be noted that, for ease of illustration, in the embodiment of the present application, the "first controller" and the "second controller" are respectively used for description according to different functions to be performed by the controller. A person skilled in the art may understand that description of the first controller and the second controller is not intended to limit specific implementations of the controllers, which can be different functional modules in a same electronic computing device, also can be separate functional modules disposed in different electronic computing devices.

An advantageous aspect of the embodiment of the present application is: by means of the pre-stored configuration information, an operator can simply and quickly adjust the machine vision detection system when the size or type of the to-be-detected component changes (for example, when the size of a to-be-detected cell changes), so that the machine vision detection system can be adapted to the changed to-be-detected component, thereby effectively improving the detection efficiency and compatibility.

Figure 4:
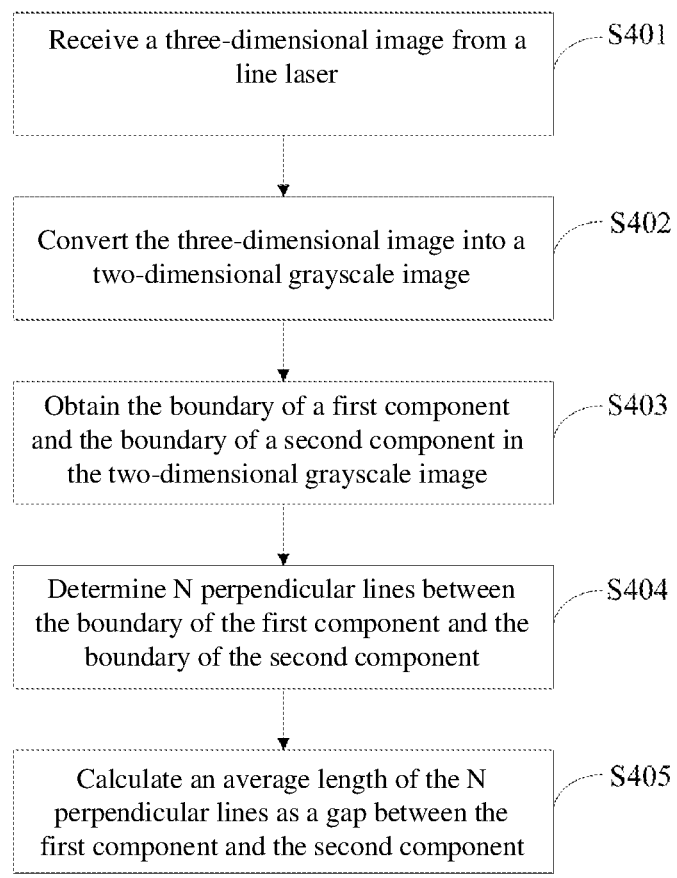
FIG. 4 is a flowchart of a machine vision detection method according to some embodiments of the present application.

According to some embodiments of the present application, FIG. 4 is a flowchart of a machine vision detection method according to some embodiments of the present application. The machine vision detection method may be performed by the first controller described above. Please refer to FIG. 4, the machine vision detection method comprises:

S401. Receive a three-dimensional image from a line laser.

Wherein, the three-dimensional image is an image signal collected and obtained by moving the line laser relative to the to-be-detected component, the image signal includes depth information. In this embodiment, the three-dimensional image includes: at least a portion of a first component, at least a portion of a second component, and at least one welding spot located between the first component and the second component.

Of course, the three-dimensional image above is specifically determined by the shooting area of the line laser. In some other embodiments, the line laser may also capture the entire to-be-detected component, as long as the welding spots formed after the pre-welding process are included, and the detection requirements can be met. This is not limited herein.

S402. Convert the three-dimensional image into a two-dimensional grayscale image.

Wherein, the three-dimensional image collected by the line laser may be a color image marked with depth information. In order to facilitate subsequent processing, an appropriate pixel conversion method may be used to convert the color image into corresponding grayscale image.

Figure 5:
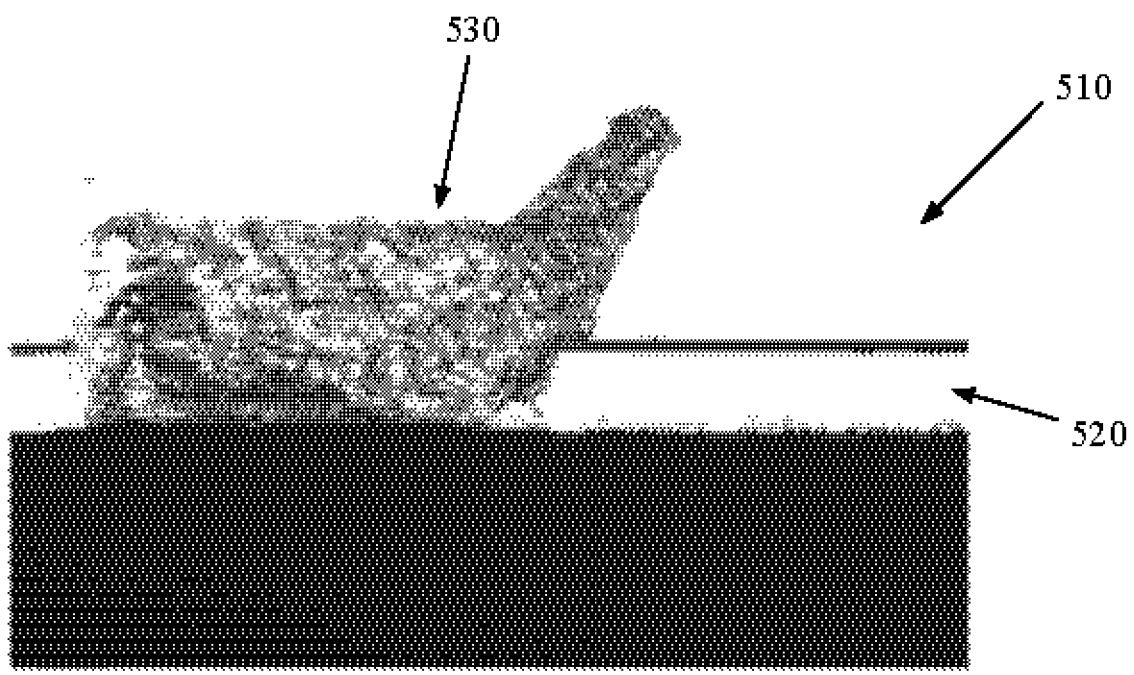
FIG. 5 is a schematic diagram of a two-dimensional grayscale diagram according to some embodiments of the present application.

For example, referring to FIG. 5, the two-dimensional grayscale image may include a portion of the boundary of a first component 510 (for example, a cell aluminum shell), a portion of the boundary of a second component 520, and a welding spot 530 located on the boundary of the first component 510 and the boundary of the second component 520. The welding spot 530 is located on the first component 510 and the second component 520 at the same time so as to fix the first component 510 and the second component 520.

S403. Obtain the boundary of the first component and the boundary of the second component in the two-dimensional grayscale image.

Wherein, "obtaining" refers to distinguishing the boundaries of the first component and the second component from other parts in the two-dimensional grayscale image, and identifying them in any suitable manner. In actual operation, various boundary extraction methods may be used, for example, edge detection algorithm based on autocorrelation function, edge detection algorithm based on grayscale co-occurrence matrix, or boundary fitting method based on the idea of differentiation.

S404. Determine N perpendicular lines between the boundary of the first component and the boundary of the second component.

Wherein, N is a positive integer, indicating the number of perpendicular lines that need to be set. It may be set by technicians according to actual needs, for example, from 20 to 50.

The "perpendicular line" is a line segment located between the boundaries of the first component and the second component, and perpendicular to the first straight line or the second straight line. a person skilled in the art may understand that, each perpendicular line represents a gap between the first component and the second component at the position where the perpendicular line is located.

S405. Calculate an average length of the N perpendicular lines as a gap between the first component and the second component.

Wherein, the length of each perpendicular line indicates a gap between the first component and the second component at the position where the perpendicular line is located, and an overall situation of the gap between the two components can be obtained by obtaining an average value of these perpendicular lines, which help to determine whether the gap between the first component and the second component after the pre-welding process meets the quality requirement of subsequent laser welding.

An advantageous aspect of the embodiment of the present application is that, when the gap between two components is calculated, there is no need to use pre-calibrated data. Furthermore, by taking an average length of a plurality of perpendicular lines as the detection result of the gap between two components, interference can be well eliminated and the detection accuracy can be improved.

Figure 6:
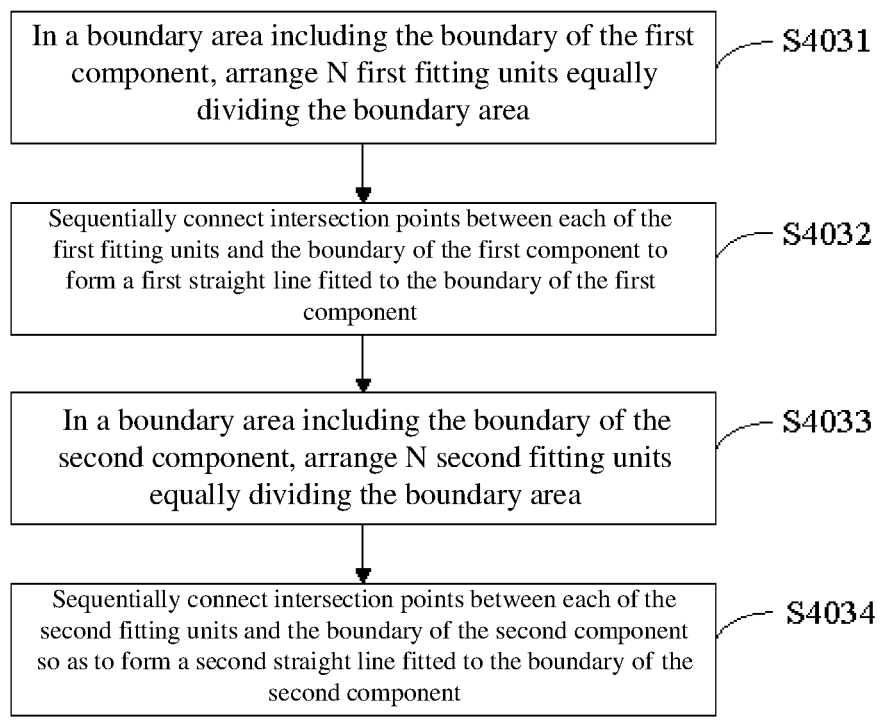
FIG. 6 is a flowchart of step S403 according to some embodiments of the present application.

According to some embodiments of the present application, referring to FIG. 6, FIG. 6 is a flowchart of a method for obtaining the boundary of a first component and the boundary of a second component in a two-dimensional grayscale image according to an embodiment of the present application. The step S403 of obtaining the boundary of the first component and the boundary of the second component specifically includes:

S4031: In a boundary area including the boundary of the first component, arrange N first fitting units equally dividing the boundary area.

Wherein, the "boundary area" is an image area including the boundary of the first component. It is a preliminary delimited image area, which can be obtained by dividing some identifiers in the image. For example, which can be simply divided by using the gap between the first component and the second component in the two-dimensional grayscale image.

The "first fitting unit" is a sampling window used for fitting, representing a step size in the fitting process. It can be understood that, for the same boundary of a first component, the more first fitting unit is arranged, the smaller the length of each first fitting unit is, and the higher the fitting degree is, and vice versa.

S4032: Sequentially connect intersection points between each of the first fitting units and the boundary of the first component to form a first straight line fitted to the boundary of the first component.

Wherein, as a sampling window, the first fitting unit in the boundary area may be a rectangular frame with a certain width. The boundary of the first component extending to the entire boundary area sequentially passes through the N first fitting units and form intersection points with the first fitting units.

Figure 7A:
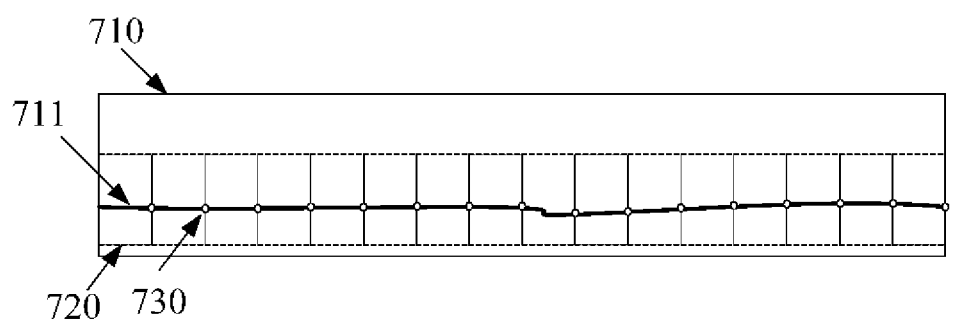
FIG. 7a is a schematic diagram of obtaining the boundary of a component according to some embodiments of the present application, which shows fitting units that evenly divide a boundary area.
Figure 7B:
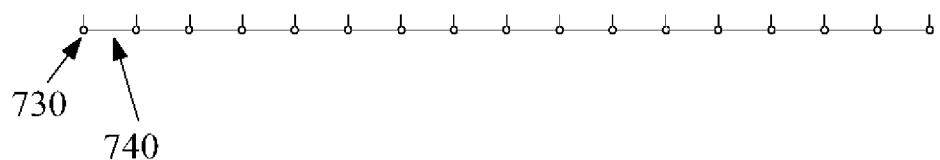

To fully illustrate the above boundary fitting process based on the idea of differentiation, the following describes a specific process of obtaining a particular segment of a boundary in a two-dimensional grayscale image based on the fitting units with reference to FIG. 7a and FIG. 7b. Please refer to FIG. 7a, a segment of boundary 711 is included in a boundary area 710.

First, based on the idea of differentiation, a plurality of fitting units 720 equally dividing the boundary area may be provided in the boundary area 710.

Then, by sequentially performing image processing and analysis on each fitting unit 720, an intersection point 730 between the boundary 711 of the first component and a fitting unit 720 can be found. It can be understood that the shorter of the fitting unit is, the closer the line segment formed by the line connecting adjacent intersection points 730 is to the line segment of the boundary 711 of the first component belonging to this fitting unit. Accordingly, the higher the fitting degree is.

Finally, a first straight line fitted to the boundary of the first component is obtained by connecting these intersection points 730 in sequence.

In some embodiments, when the final fitting result is presented, only the formed intersection points 730 and the line segments 740 connecting two of the intersection points 730 may be displayed, shown in the form of connected line segments similar to FIG. 7b, like a caliper. Thus, the fitting unit 720 may also be referred to as "caliper" in some embodiments.

S4033. In a boundary area including the boundary of the second component, arrange N second fitting units equally dividing the boundary area.

The method for obtaining the boundary of the second component is the same as the method for obtaining the boundary of the first component in steps S4031 and S4032. For details, refer to the fitting process shown in FIG. 7a and FIG. 7b. In this embodiment, the "first" and "second" used herein are only to distinguish sampling windows provided in the first component and the second component, and is not used to specifically limit the sampling window.

S4034: Sequentially connect the intersection points between each of the second fitting units and the boundary of the second component so as to form a second straight line fitted to the boundary of the second component.

Wherein, the method for obtaining the second straight line is similar to the method for obtaining the first straight line, that is sequentially connecting intersection points formed by fitting units.

It should be noted that, for ease of illustration, in FIG. 6, the steps of obtaining the boundary of a first component and the boundary of a second component are numbered. However, a person skilled in the art may understand that the order of the numbers is not used to limit the execution order of the steps.

In some embodiments, it is surprisingly found that N can be set to a positive integer between 20 and 50. Such a numerical range can also balance the required calculation amount under the condition that the normal detection accuracy requirement is met.

In such a manner of generating a fitted straight line, a desired fitted straight line can be conveniently obtained by adjusting the number of sampling units (such as the number of calipers), so as to meet the detection requirements of the gap between the first component and the second component.

According to the embodiment of the present application, optionally, on the basis of generating a first straight line and a second straight line based on N fitting units, the step of generating N perpendicular lines may specifically comprise:

First, determine intersection points between N first fitting units and the boundary of the first component as set points for perpendicular lines. Then, generate N perpendicular lines perpendicular to the second straight line by taking each set point for perpendicular line as a starting point respectively.

Please refer to FIG. 7a and FIG. 7b, since the fitting units 720 are sampling windows used for equally dividing the boundary area, one intersection point of adjacent fitting units coincides with each other. Therefore, arranging N fitting units typically forms N intersection points 730. The set point for perpendicular line (i.e., the intersection point 730) is the starting point of each perpendicular line, and finally N perpendicular lines may be formed.

In the embodiment of the present application, the caliper or sampling units used to generate the second straight line are utilized to arrange the perpendicular lines correspondingly, so that the perpendicular lines can also be evenly distributed. The interval between two perpendicular lines can have a suitable distance.

Of course, in addition to taking the caliper or sampling units which are used to generate the second straight line as reference for arranging perpendicular lines, in other embodiments, the perpendicular lines may be arranged based on the sampling units used to generate the second straight line, that is, determining intersection points between N second fitting units and the boundary of the second component as set points for perpendicular lines; and generate N perpendicular lines perpendicular to the first straight line by taking each set point for perpendicular line as a starting point respectively The perpendicular lines arranged in this way has the same number as the sampling units. The plurality of perpendicular lines can be evenly distributed in the gap between the components in the two-dimensional image, so that the calculation result of the average length of the perpendicular lines is close to the real gap between the two components.

Figure 8:
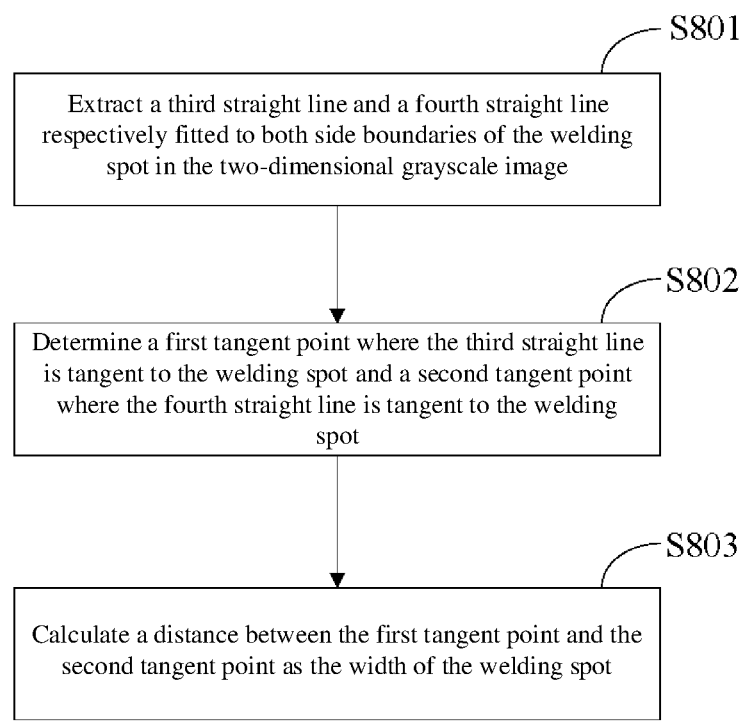
FIG. 8 is a flowchart of a machine vision detection method according to other embodiments of the present application.

According to some embodiments of the present application, FIG. 8 is a machine vision detection method according to another embodiment of the present application. Referring to FIG. 8, in addition to detecting the gap between the first component and the second component, the detection method may further perform the following steps based on the two-dimensional grayscale image.

S801. Extract a third straight line and a fourth straight line respectively fitted to both side boundaries of a welding spot in the two-dimensional grayscale image.

Wherein, the "welding spot" may be a welding position used to realize initial positioning between the first component and the second component after the pre-welding process, for example, as shown in FIG. 5, the welding spot 530 located on the first component 510 and the second component 520. Of course, the weld site may present any type of shape and area in a two-dimensional grayscale image based on actual welding conditions.

Similar to the method for extracting the edge of a component, appropriate image processing steps may also be used to perform edge extraction on a welding spot to obtain boundaries on both sides of the welding spot. It should be noted that "the third straight line" and "the fourth straight line" are only used to distinguish fitted straight lines at different positions on both sides of a welding spot, and are not used to limit specific implementations such as the length of straight line or a fitting method.

S802. Determine a first tangent point where the third straight line is tangent to the welding spot and a second tangent point where the fourth straight line is tangent to the welding spot.

Wherein, the "tangent point" refers to a tangent point between a fitted straight line of the boundary and an area occupied by a welding spot in the two-dimensional grayscale image, and also indicates a position where the welding spot intersects with a gap on this side boundary. In the present embodiment, the "first tangent point" and the "second tangent point" are used to distinguish tangent points located on both sides of a welding spot, and are not used to limit the positions of the two tangent points.

S803. Calculate a distance between the first tangent point and the second tangent point as the width of the welding spot.

Wherein, the width of the welding spot may be considered as the width of the welding spot on the gap between the two components along the gap extension direction, which may be represented by a distance between the two tangent points located at the most distal ends. Thus, the distance between two tangent points can be calculated as the width of the welding spot to determine welding quality of the pre-welding process.

An advantageous aspect of the embodiment of the present application is: on the basis of a two-dimensional grayscale image, a method for detecting the width of a welding spot is further provided, so that the accuracy of the detection result of pre-welding process can be ensured, and failure of full welding can be avoided.

Figure 9:
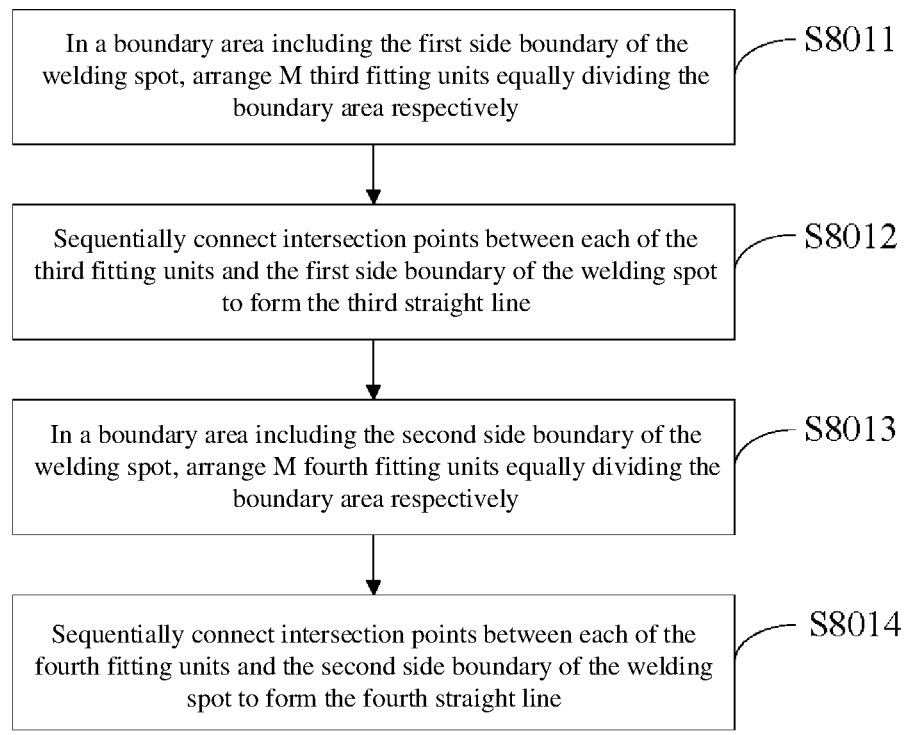
FIG. 9 is a flowchart of step S801 according to some embodiments.

According to some embodiments of the present application, optionally, referring to FIG. 9, step S801 of extracting the third straight line and the fourth straight line may specifically comprise the following steps:

S8011: In a boundary area including the first side boundary of the welding spot, arrange M third fitting units equally dividing the boundary area respectively.

S8012: Sequentially connect intersection points between each of the third fitting units and the first side boundary of the welding spot to form the third straight line.

Wherein, M is an empirical value, which may be set by technicians according to actual needs, a larger number of fitting units may result in a smoother fitted straight line, and a smaller number of fitting units may result in less calculation amount.

In some embodiments, it is surprisingly found that M can be set to a positive integer between 30 and 50. Such numerical range can also balance the required calculation amount under the condition that the normal detection accuracy requirement is met.

S8013: In a boundary area including the second side boundary of the welding spot, arrange M fourth fitting units equally dividing the boundary area respectively.

S8014: Sequentially connect intersection points between each of the fourth fitting units and the second side boundary of the welding spot to form the fourth straight line.

Wherein, the method for obtaining the boundaries on both sides of the welding spot is the same as the method for obtaining the boundary of the first component and the boundary of the second component described above. For a specific implementation process, please refer to FIG. 7a and FIG. 7b. Details are not described herein again.

In the embodiment of the present application, it is also possible to conveniently adjust the fitting degree of the boundaries on both sides of the welding spot by adjusting the number of fitting units (such as the number of calipers), so as to obtain a desired fitted straight line and meet the requirements for detecting the width of the welding spot.

In some embodiments, optionally, during obtaining the fitted straight line based on the method shown in FIG. 9, the following steps may be used to determine the first tangent point and the second tangent point: first, take the intersection point between the last third fitting unit on the third straight line and one side boundary of the welding spot as the first tangent point. Secondly, take the intersection point between the last fourth fitting unit on the fourth straight line and the other side boundary of the welding spot as the second tangent point. In other words, the intersection points between the last fitting units of the fitted straight lines and the boundary may be selected as tangent points for calculating the width of the welding spot.

For example, as shown in FIG. 7b, the intersection point on the last fitting unit may be substantially regarded as the end of the segment of boundary that needs to be obtained. Thus, the positions of the last intersection points on the third straight line and the fourth straight line are substantially the junctions between the welding spot and the gap, and they are determined as the first tangent point and the second tangent point.

In some other embodiments, optionally, during obtaining the fitted straight line based on the method shown in FIG. 9, the method for determining the first tangent point and the second tangent point may further comprise the following steps: first, take the intersection point between the third straight line and the first straight line as the first tangent point. Then, take the intersection point between the fourth straight line and the first straight line as the second tangent point. In other words, the positions where the first straight line intersects with the fitted straight lines on both sides of the welding spot may be used as the tangent points for calculating the width of the welding spot. The junctions between the welding spot and the gap may also be determined with the above method, and then they are determined as the first tangent point and the second tangent point.

Figure 10:
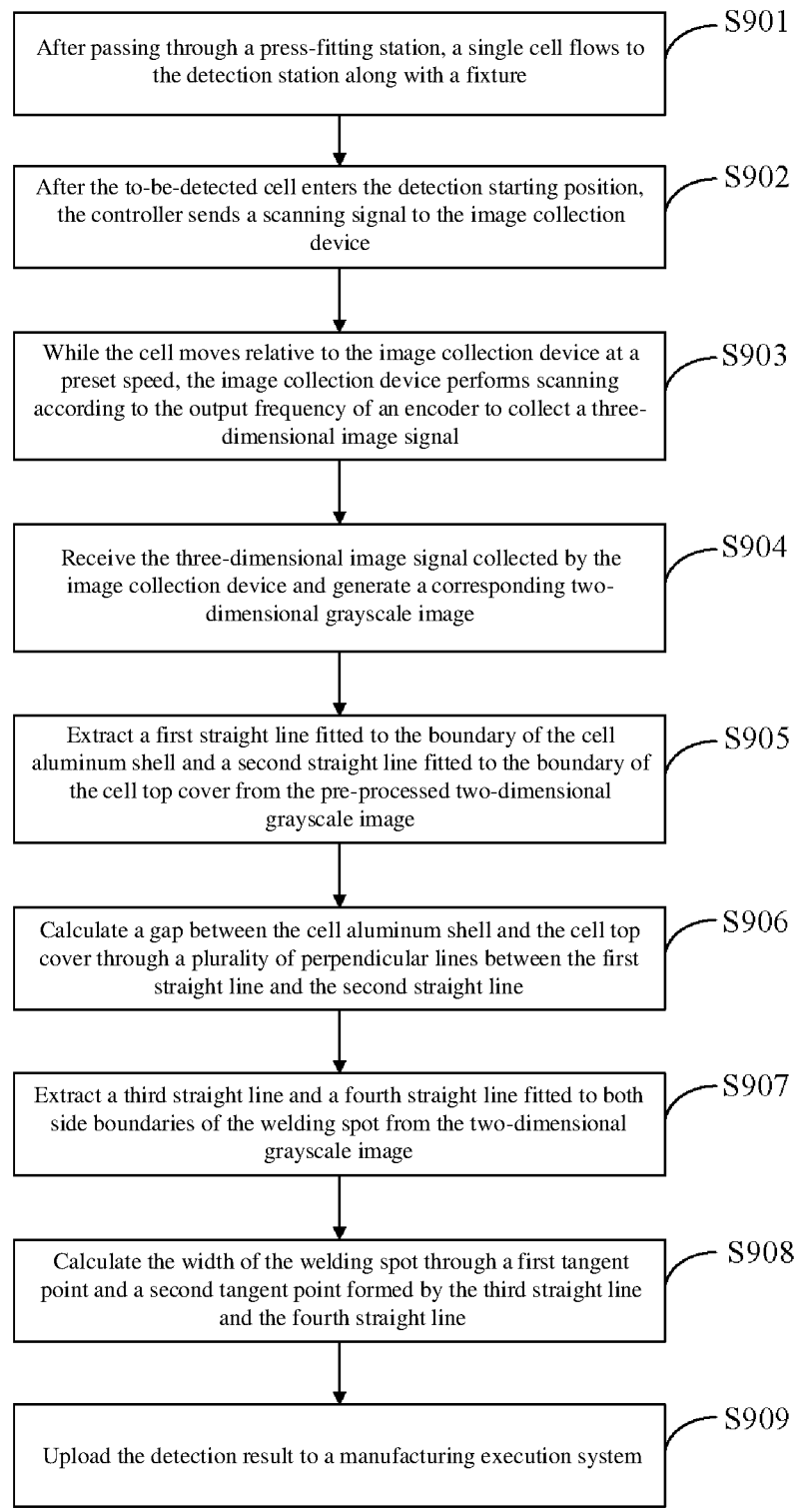
FIG. 10 is a flowchart of a machine vision detection method according to some embodiments of the present application, wherein the to-be-detected component is a cell top cover and a cell aluminum shell after a pre-welding process is performed.
Figure 11:
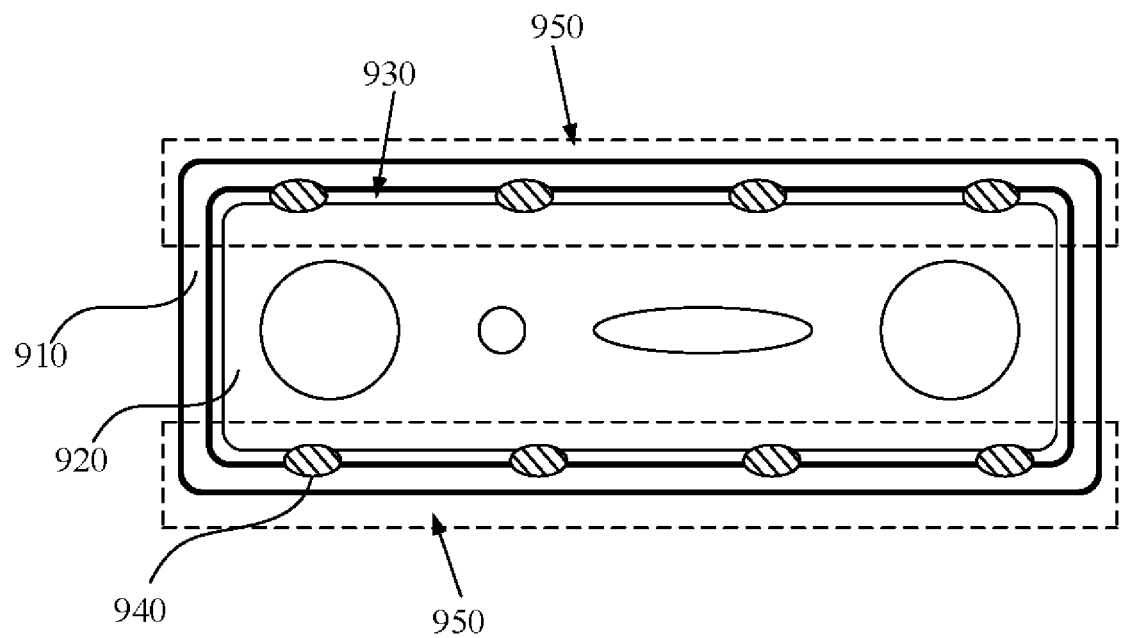
FIG. 11 is a schematic diagram of a to-be-detected components according to some embodiments of the present application, which shows a cell top cover and a cell aluminum shell detected in FIG. 9.

According to the embodiment of the present application, please refer to FIGS. 10 and 11. FIG. 10 is a flowchart of a method for detecting a gap and the width of a welding spot of a pre-welded components according to an embodiment of the present application. FIG. 11 is a schematic diagram of a cell after a pre-welding process according to an embodiment of the present application; The method for detecting the gap and the width of a welding spot of components comprise the following step:

S901. After passing through a press-fitting station, a single cell flows to a sampling area where the image collection device is located along with a fixture.

Please refer to FIG. 11, the to-be-detected components after the pre-welding process are mainly composed of a cell aluminum shell 910 and a cell top cover 920. The cell aluminum shell 910 is in a long rectangular shape and has two symmetrical sides. The cell top cover 920 is enclosed within the cell aluminum shell 910 and has an outline that is close to the cell aluminum shell. There is a gap 930 between the two components. There are a plurality of welding spots 940 covering on the gap 930.

S902. After the to-be-detected cell enters the detection starting position, the controller sends a scanning signal to the image collection device.

Wherein, the controller may specifically determine, by using any suitable type of sensor (for example, an infrared sensor), whether the cell has entered the detection starting position. The controller may be a programmable logic controller (PLC) or any other suitable type of electronic processing device.

S903. When the driving mechanism drives the cell to move relative to the image collection device at a preset speed, the image collection device that received the scanning signal performs scanning according to an output frequency of the encoder to collect three-dimensional image signal.

Wherein, the encoder is a component that feeds back a relative movement speed of the to-be-detected cell. Thus, the line laser can scan and obtain the three-dimensional image signal of the cell by using a scanning frequency adapted to the relative movement speed of the cell according to the output frequency of the encoder.

In some embodiments, please refer to FIG. 11, the line lasers may be arranged in a pair, so as to form a shooting area covering two symmetrical long sides of the cell aluminum shell 910 and the cell top cover 920 as shown by the dashed box 950 in the figure. In the shooting area, there are a plurality of welding spots 940 for realizing the initial positioning of the cell aluminum shell 910 and the cell top cover 920.

S904. The controller receives the three-dimensional image signal collected by the image collection device and generates a corresponding two-dimensional grayscale image.

Wherein, the processing operation on the three-dimensional image in the foregoing step S904 may be executed in a corresponding image software system by invoking one or more algorithms. In some embodiments, a coordinate system may be established according to the positional relationship between the long side and the short side of the cell aluminum shell, which facilitates subsequent calculation and operation.

For example, the long side and short side of the cell aluminum shell may be obtained, and then an intersection point between the long side and the short side is used as a positioning point of the coordinate system, and a rotation angle of the long side and the short side relative to the coordinate system is used as a reference angle, so as to establish a coordinate system in which the y-axis of the coordinate system is parallel to the long side, and the x-axis of the coordinate system is parallel to the short side.

S905. The controller extracts a first straight line fitted to the boundary of the cell aluminum shell and a second straight line fitted to the boundary of the cell top cover from the pre-processed two-dimensional grayscale image.

Wherein, the controller may be any suitable type of computing device with logic operation capability deployed in production lines or detection sites. The controller runs corresponding image processing software to implement a series of image processing operations on two-dimensional grayscale images.

S906. Calculate the gap between the cell aluminum shell and the cell top cover through a plurality of perpendicular lines between the first straight line and the second straight line.

Wherein, the number of perpendicular lines to be calculated may be determined by the number of calipers used when the fitted straight line is generated. In other words, the intersection point between each sampling unit (i.e., the caliper) and the boundary of the component is used as the starting point of a perpendicular line to calculate the distance therefrom to the fitted straight line on the other side. Such a detection method of getting an average value from multiple calculations is advantageous to provide a more accurate gap detection result.

In some embodiments, by comparing the gap detection result with a preset gap threshold, it can be determined whether the to-be-detected component after the pre-welding process meets the requirements. The gap threshold may be set according to actual needs, for example, it may be set to 0.08 mm S907. The controller extracts a third straight line and a fourth straight line fitted to boundaries on both sides of the welding spot from the two-dimensional grayscale image.

In addition to extracting the edges of the cell top cover and the cell aluminum shell, a similar edge extraction algorithm can be used to obtain straight lines fitted to the boundaries on both sides of the welding spot. Please refer to FIG. 11, both sides of the welding spot refer to two sides through which the gap extends.

S908. Calculate the width of the welding spot through the first tangent point and the second tangent point formed by the third straight line and the fourth straight line.

Wherein, there are many ways to find out the first tangent point and the second tangent point at the farthest end to calculate the width of the welding spot. Similar to the gap between the two components described above, the width of the welding spot usually needs to be within a certain range, so as to avoid the situation of poor welding. In some embodiments, the standard range of the width of the welding spot may be 3-5 mm.

In some embodiments, the points where the last sampling units (i.e., the caliper) of the third straight line and the fourth straight line intersect with the edge of the welding spot may be taken as two tangent points. In some other embodiments, two intersection points where the third straight line and the fourth straight line intersect with the first straight line also may be used as the tangent points, respectively.

S909. Upload the detection result to a manufacturing execution system (MES).

Wherein, the detection result refers to calculated data information such as component gap and/or the width of a welding spot. The detection result may be fed back to the manufacturing execution system and presented in any suitable form to operators in real time in a display device such as a monitor.

An advantageous aspect of the embodiment of the present application is that continuous sampling can be supported without stopping at the position of each welding spot, and the detection speed is improved. Furthermore, when a component is detected, the real component gap and the width of a welding spot can be detected in the two-dimensional grayscale image, which is not easily affected by external light sources or the like, and the detection accuracy is effectively improved.

Figure 12:
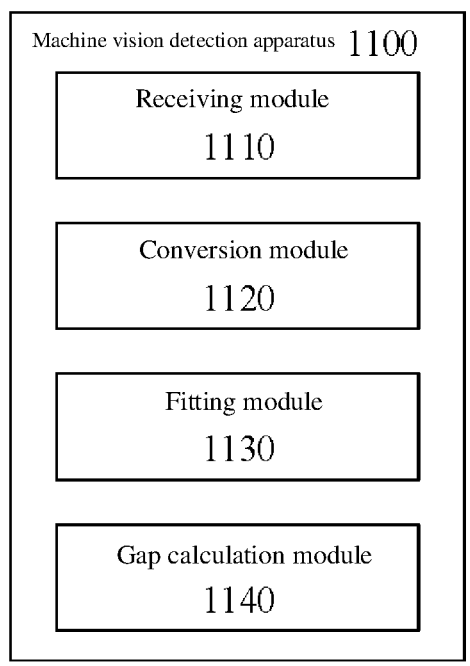
FIG. 12 is a schematic diagram of a machine vision detection apparatus according to some embodiments of the present application.

According to some embodiments of the present application, refer to FIG. 12. FIG. 12 is a machine vision detection apparatus according to an embodiment of the present application. The machine vision detection apparatus 1100 includes: a receiving module 1110, a conversion module 1120, a fitting module 1130, and a gap calculation module 1140.

Wherein, the receiving module 1110 is configured to receive a three-dimensional image from a line laser. The three-dimensional image includes at least a portion of the boundary of a first component, at least a portion of the boundary of a second component, and at least one welding spot located on the boundaries of the first component and the second component. The conversion module 1120 is configured to convert the three-dimensional image into a two-dimensional grayscale image. The fitting module 1130 is configured to obtain the boundary of the first component and the boundary of the second component in the two-dimensional grayscale image. The gap calculation module 1140 is configured to determine N perpendicular lines located between the boundary of the first component and the boundary of the second component; and calculate an average length of the N perpendicular lines as a gap between the first component and the second component, where N is a positive integer.

In operation, the receiving module 1110 receives a three-dimensional image including two components and welding spots that cover between the components and provides same to the conversion module 1120. The conversion module 1120 converts the three-dimensional image into a two-dimensional grayscale image. The fitting module 1130 performs edge extraction in the two-dimensional grayscale image generated by the conversion module 1120 to obtain boundaries of the two components. The gap calculation module 1140 calculates the lengths of the perpendicular lines between the boundaries of two component for multiple times, and then obtains the gap between two components after averaging.

An advantageous aspect of the embodiments of the present application is that, when the gap between the components is detected, a more accurate gap measurement result can be obtained by averaging multiple detection results. In addition, by performing image collection based on line lasers, a series of interference caused by factors such as light source being blocked in traditional cameras can be effectively eliminate while achieving continuous sampling.

Figure 13:
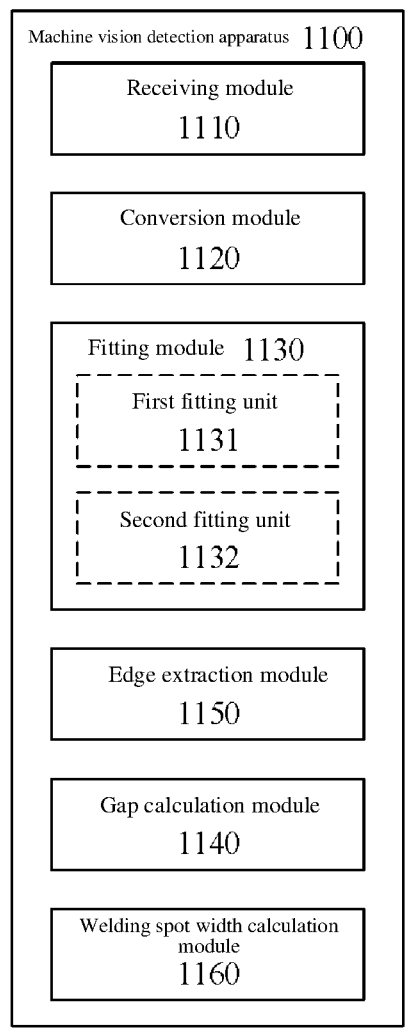
FIG. 13 is a schematic diagram of a machine vision detection apparatus according to other embodiments of the present application.

According to some embodiments of the present application, optionally, please refer to FIG. 13, the fitting module 1130 may specifically include a first fitting unit 1131 and a second fitting unit 1132.

Wherein, the first fitting unit 1131 is used to arrange 20 to 50 first fitting units equally dividing the boundary area which includes the boundary of the first component, and sequentially connect intersection points between each of the first fitting units and the boundary of the first component to form a first straight line. The second fitting unit 1132 is used to arrange 20 to 50 second fitting units equally dividing the boundary area which includes the boundary of the second component, and sequentially connect intersection points between each of the second fitting units and the boundary of the second component to form a second straight line. The edge extraction method based on the idea of differentiation is capable of conveniently changing the fitting degree by adjusting the number of fitting units, and generating fitted straight lines that meet use requirements of indicating and defining the boundaries of the two components.

According to some embodiments of the present application, optionally, on the basis of generating fitted straight lines by using fitting units, the gap calculation module 1140 is specifically configured to: determine N intersection points between N first fitting units and the boundary of the first component as set points for perpendicular lines, generate N perpendicular lines perpendicular to the second straight line by taking each set point for perpendicular line as a starting point respectively, or determine N intersection points between the N second fitting units and the boundary of the second component as set points for perpendicular lines, and generate N perpendicular lines perpendicular to the first straight line by taking each set point for perpendicular line as a starting point respectively. Such a method for arranging perpendicular lines is based on the fitting unit that generates fitted straight line, wherein, a plurality of perpendicular lines with the same number as the fitting units are generated and evenly distributed, which can be used to implement the gap detection method that averaging multiple detection results.

According to some embodiments of the present application, optionally, please refer to FIG. 13, the machine vision detection apparatus further includes an edge extraction module 1150 and a welding spot width calculation module 1160.

Wherein, the edge extraction module 1150 is configured to extract a third straight line and a fourth straight line that are respectively fitted to both side boundaries of the welding spot in the two-dimensional grayscale image. The welding spot width calculation module 1160 is configured to determine a first tangent point where the third straight line is tangent to the welding spot and a second tangent point where the fourth straight line is tangent to the welding spot and calculate a distance between the first tangent point and the second tangent point as the width of the welding spot. Such technical solution further performs automatic detection of the width of the welding spot on the basis of detecting the gap between the components in the two-dimensional grayscale image, which is advantageous for comprehensively evaluating the quality of the pre-welding process.

According to some embodiments of the present application, optionally, the edge extraction module 1150 is specifically configured to: arrange 30-50 third fitting units respectively in a boundary area on one side of the welding spot that equally divide the boundary area on this side of the welding spot; sequentially connect intersection points between each of the third fitting units and this side boundary of the welding spot so as to form a third straight line; arrange 30-50 fourth fitting units respectively in a boundary area on the other side of the welding spot that equally divide the boundary area on the other side of the welding spot; and sequentially connect intersection points between each of the fourth fitting units and the other side boundary of the welding spot so as to form a fourth straight line. In such a design, a manner similar to component edge extraction is used to obtain a third straight line and a fourth straight line fitted to the boundaries on both sides of the welding spot, which can help to complete automatic detection of the width of the welding spot.

In some embodiments, optionally, when the first tangent point and the second tangent point are determined, the welding spot width calculation module 1160 is specifically configured to: take the intersection point between the last third fitting unit on the third straight line and the side boundary of the welding spot as the first tangent point; and take the intersection point between the last fourth fitting unit on the fourth straight line and the other side boundary of the welding spot as the second tangent point. In such a design, the positions of the last sampling units of the third straight line and the fourth straight line are used as two tangent points, so that the positions of the two tangent points can be determined simply and quickly.

In some other embodiments, optionally, when the first tangent point and the second tangent point are determined, the welding spot width calculation module 1160 is specifically configured to: take the intersection point between the third straight line and the first straight line as the first tangent point; and take the intersection point between the fourth straight line and the first straight line as the second tangent point. In such a design, the intersection points between the fitted straight lines of boundaries of the components and the fitted straight lines of edges on both sides of the welding spot obtained from previous detection are used to obtain two tangent points, and it is also possible to quickly and conveniently determine the positions of the two tangent points.

It should be noted that, in the embodiment of the present application, the functional modules of the machine vision detection apparatus are divided according to the method steps to be performed. In some embodiments, one or more functional modules (for example, the receiving module, conversion module, fitting module, gap calculation module, edge extraction module and welding spot width calculation module) in the machine vision detection apparatus in the embodiment of the present application may be divided into more functional modules based on actual needs, so as to perform corresponding method steps. In some other embodiments, one or more functional modules in a machine vision detection apparatus in the embodiments of the present application may also be integrated into fewer functional modules to perform corresponding method steps.

Figure 14:
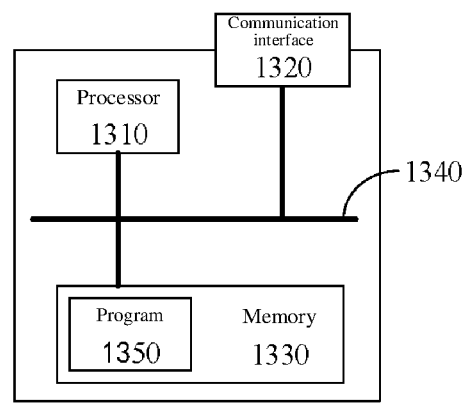
FIG. 14 is a schematic diagram of an electronic device according to some embodiments of the present application.

According to some embodiments of the present application, please refer to FIG. 14, FIG. 14 is a schematic structural diagram of an electronic device according to some embodiments of the present application. The electronic device may be a first controller, a second controller, or any other suitable type of electronic computing platform for running the image software system described above, the specific implementation thereof is not limited herein.

The electronic device may include: a processor 1310, a communication interface 1320, a memory 1330, and a communication bus 1340.

Wherein, the processor 1310, the communication interface 1320, and the memory 1330 communicate with each other through the communication bus 1340. The communication interface 1320 is used to communicatively connected with other devices (for example, the image collection device). The processor 1310 is used to invoke a program 1350 to perform one or more method steps in the machine vision detection method in the above-mentioned embodiments or implement one or more functional modules in the machine vision detection apparatus in the above-mentioned embodiments. Specifically, the program 1350 may include program code or computer operation instructions.

In this embodiment, the processor 1310 may be a central processing unit, other general-purpose processors, digital signal processors, application specific integrated circuits, field programmable gate arrays or other programmable logic devices, discrete gates or transistor logic devices, discrete hardware components, etc., depending on the type of hardware used.

The memory 1330 is used to store the program 1350. The memory 1330 may include a high-speed RAM memory, or may further include non-volatile memory, for example, at least one disk memory.

The embodiment of the present application further provides a computer-readable storage medium. The computer-readable storage medium may be a non-volatile computer-readable storage medium. The computer-readable storage medium stores a computer program.

When the computer program is executed by the processor, one or more method steps in the machine vision detection method in the above-mentioned embodiments are implemented or one or more functional modules in the machine vision detection apparatus in the above-mentioned embodiments are implemented. A complete computer program product is embodied on one or more computer-readable storage media (including but not limited to disk memory, CD-ROM, optical memory, and the like) containing the computer program disclosed in the embodiments of the present application.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A machine vision detection method, comprising:
receiving a three-dimensional image from a line laser, the three-dimensional image comprising: at least a portion of a boundary of a first component, at least a portion of a boundary of a second component, and a welding spot located on the boundary of the first component or the boundary of the second component;
converting the three-dimensional image into a two-dimensional grayscale image;
obtaining the boundary of the first component and the boundary of the second component in the two-dimensional grayscale image;
generating N perpendicular lines between the boundary of the first component and the boundary of the second component, where N is a positive integer between 20 and 50; and
calculating an average length of the N perpendicular lines as a gap between the first component and the second component;
wherein obtaining the boundary of the first component and the boundary of the second component in the two-dimensional grayscale image comprises:
arranging, in a boundary area including the boundary of the first component, N first fitting units equally dividing the boundary area;
sequentially connecting intersection points each between one of the first fitting units and the boundary of the first component to form a first straight line fitted to the boundary of the first component;
arranging, in a boundary area including the boundary of the second component, N second fitting units equally dividing the boundary area; and
sequentially connecting intersection points each between one of the second fitting units and the boundary of the second component to form a second straight line fitted to the boundary of the second component.

2. The method according to claim 1, wherein generating the N perpendicular lines between the boundary of the first component and the boundary of the second component comprises:
determining intersection points between the N first fitting units and the boundary of the first component as first set points, and generating the N perpendicular lines perpendicular to the second straight line by taking the first set points as starting points, respectively; or
determining intersection points between the N second fitting units and the boundary of the second component as second set points, and generating the N perpendicular lines perpendicular to the first straight line by taking the second set points as starting points, respectively.

3. The method according to claim 1, further comprising:
extracting a third straight line and a fourth straight line respectively fitted to two side boundaries of the welding spot in the two-dimensional grayscale image;
determining a first tangent point where the third straight line is tangent to the welding and the second side boundary of the welding spot as the second tangent point.

4. The method according to claim 3, wherein extracting the third straight line and the fourth straight line respectively fitted to the two side boundaries of the welding spot in the two-dimensional grayscale image comprises:
arranging, in a boundary area including the first side boundary of the welding spot, M third fitting units equally dividing the boundary area, where M is a positive integer between 30 and 50;
sequentially connecting intersection points each between one of the third fitting units and the first side boundary of the welding spot to form the third straight line;

arranging, in a boundary area including the second side boundary of the welding spot, M fourth fitting units equally dividing the boundary area respectively;

sequentially connecting intersection points each between one of the fourth fitting units and the second side boundary of the welding spot to form the fourth straight line.

5. The method according to claim 4, wherein determining the first tangent point where the third straight line is tangent to the welding spot and the second tangent point where the fourth straight line is tangent to the welding spot comprises:

taking the intersection point between the last third fitting unit on the third straight line and the first side boundary of the welding spot as the first tangent point; and taking the intersection point between the last fourth fitting unit on the fourth straight line arranging, in a boundary area including the boundary of the first component, N first fitting units equally dividing the boundary area;

sequentially connecting intersection points each between one of the first fitting units and the boundary of the first component to form a first straight line fitted to the boundary of the first component;

arranging, in a boundary area including the boundary of the second component, N second fitting units equally dividing the boundary area; and sequentially connecting intersection points each between one of the second fitting units and the boundary of the second component to form a second straight line fitted to the boundary of the second component;

generating N perpendicular lines between the boundary of the first component and the boundary of the second component, where N is a positive integer between 20 and 50; and calculating an average length of the N perpendicular lines as a gap between the first component and the second component.

6. The method according to claim 4, wherein determining the first tangent point where the third straight line is tangent to the welding spot and the second tangent point where the fourth straight line is tangent to the welding spot comprises:

taking an intersection point between the third straight line and the first straight line as the first tangent point; and taking an intersection point between the fourth straight line and the first straight line as the second tangent point.

7. A non-volatile computer storage medium, storing computer program instructions that, when executed by a processor, cause the processor to perform the method according to claim 1.

8. An electronic device, comprising:
a processor; and
a memory communicatively connected with the processor and storing computer program instructions that, when executed by the processor, cause the processor to perform a machine vision detection method comprising:

receiving a three-dimensional image from a line laser, the three-dimensional image comprising: at least a portion of a boundary of a first component, at least a portion of a boundary of a second component, and a welding spot located on the boundary of the first component or the boundary of the second component;

converting the three-dimensional image into a two-dimensional grayscale image;

obtaining the boundary of the first component and the boundary of the second component in the two-dimensional grayscale image, comprising:

spot and a second tangent point where the fourth straight line is tangent to the welding spot; and calculating a distance between the first tangent point and the second tangent point as a width of the welding spot.

9. A machine vision detection apparatus, comprising:

a receiving module configured to receive a three-dimensional image from a line laser, the three-dimensional image comprising: at least a portion of a boundary of a first component, at least a portion of a boundary of a second component, and a welding spot located on the boundary of the first component or the boundary of the second component;

a conversion module configured to convert the three-dimensional image into a two-dimensional grayscale image;

a fitting module configured to obtain the boundary of the first component and the boundary of the second component in the two-dimensional grayscale image, comprising:

arranging, in a boundary area including the boundary of the first component, N first fitting units equally dividing the boundary area, where N is a positive integer between 20 and 50; and arranging, in a boundary area including the boundary of the second component, N second fitting units equally dividing the boundary area; and a gap calculation module configured to determine N perpendicular lines between the boundary of the first component and the boundary of the second component and calculate an average length of the N perpendicular lines as a gap between the first component and the second component.

* * * * *